United States Patent
Matsumoto et al.

(10) Patent No.: US 6,980,805 B2
(45) Date of Patent: Dec. 27, 2005

(54) METHOD FOR CONTROL HAND-OFF OF CDMA SYSTEM, BASE STATION USED THEREFOR, AND BASE STATION CONTROLLER

(75) Inventors: Norihisa Matsumoto, Isehara (JP); Tamio Saito, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/135,823

(22) Filed: Apr. 26, 2002

(65) Prior Publication Data

US 2002/0132628 A1 Sep. 19, 2002

Related U.S. Application Data

(63) Continuation of application No. PCT/JP99/06031, filed on Oct. 29, 1999.

(51) Int. Cl.[7] .................................................. H04Q 7/20
(52) U.S. Cl. ...................... 455/440; 455/436; 455/442; 370/331; 370/332
(58) Field of Search ............................... 455/436, 437, 455/438, 439, 440, 441, 442, 443, 447, 450, 451, 452, 456, 509; 370/328, 329, 331, 332, 333, 334, 335, 341; 342/350, 357.06, 357.08, 357.09, 357.1

(56) References Cited

U.S. PATENT DOCUMENTS

| | | | | |
|---|---|---|---|---|
| 5,432,842 A | * | 7/1995 | Kinoshita et al. | 455/440 |
| 5,657,487 A | * | 8/1997 | Doner | 455/456.1 |
| 5,913,168 A | * | 6/1999 | Moreau et al. | 455/441 |
| 6,029,070 A | * | 2/2000 | Kingdon et al. | 455/456.4 |
| 6,111,864 A | | 8/2000 | Kabasawa | |
| 6,263,208 B1 | * | 7/2001 | Chang et al. | 455/456.1 |
| 6,393,003 B1 | | 5/2002 | Lee | |
| 6,421,538 B1 | * | 7/2002 | Byrne | 455/441 |
| 6,496,709 B2 | * | 12/2002 | Murray | 455/569.1 |
| 6,507,741 B1 | * | 1/2003 | Bassirat | 455/440 |
| 6,560,462 B1 | * | 5/2003 | Ravi et al. | 455/456.1 |

FOREIGN PATENT DOCUMENTS

| | | |
|---|---|---|
| EP | 0 335 558 | 10/1989 |
| EP | 0 501 808 A2 | 9/1992 |
| EP | 0 928 078 A1 | 7/1999 |
| JP | 01-298820 | 12/1989 |
| JP | 04-271624 | 9/1992 |
| JP | 06-69859 | 3/1994 |
| JP | 10-155173 | 6/1998 |
| JP | 10-319109 | 12/1998 |
| JP | 11-041645 | 2/1999 |
| JP | 11-69418 | 3/1999 |

OTHER PUBLICATIONS

Chiu M–H, et al., "Predictive Channel Reservation for Mobile Cellular Networks Based on GPS Measurements" Personal Wireless Communication, 1999 IEEE International Conference on Jaipur, India Feb.17–19, 1999, Piscataway, NJ. pp. 441–445, XP010329633: ISBN:0–7803–4912–1.
Chiu M–H, et al. "Performance Evaluation of PositionBased Channel Reservationfor Handoff of Cellular Calls" 1999 IEEE 49th. Vehicular Technology Conference. Houston, TX. May 16–20, 1999, IEEE, vol. 3, Conf. 49 pp. 1799–1803, XP000905707: ISBN: 0–7803–5566–0.

* cited by examiner

Primary Examiner—Temica M. Beamer
(74) Attorney, Agent, or Firm—Katten Muchin Rosenman LLP

(57) ABSTRACT

A handoff method of a CDMA mobile communication system in which one or a plurality of tiers of wireless frequencies are assigned on an individual wireless zone basis, locational information of a mobile device is obtained, and when, according to the foregoing locational information, the mobile device is present in the vicinity of a frequency-tier boundary where different frequency tiers are assigned to a cell conducting a communication and an adjacent cell, an inter-frequency handoff is performed to a tier of a common frequency prepared commonly in both the foregoing cell conducting the communication and the foregoing adjacent cell.

13 Claims, 15 Drawing Sheets

FIG.10
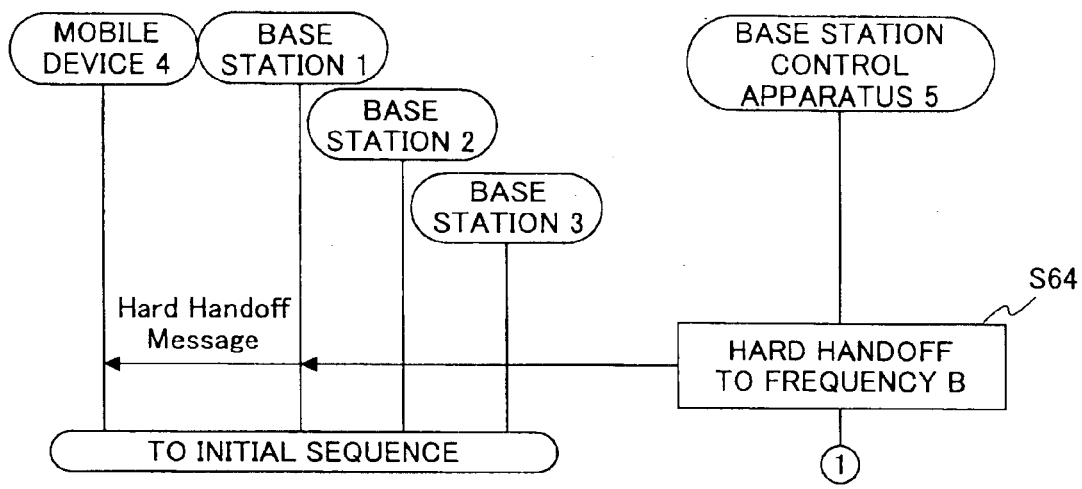
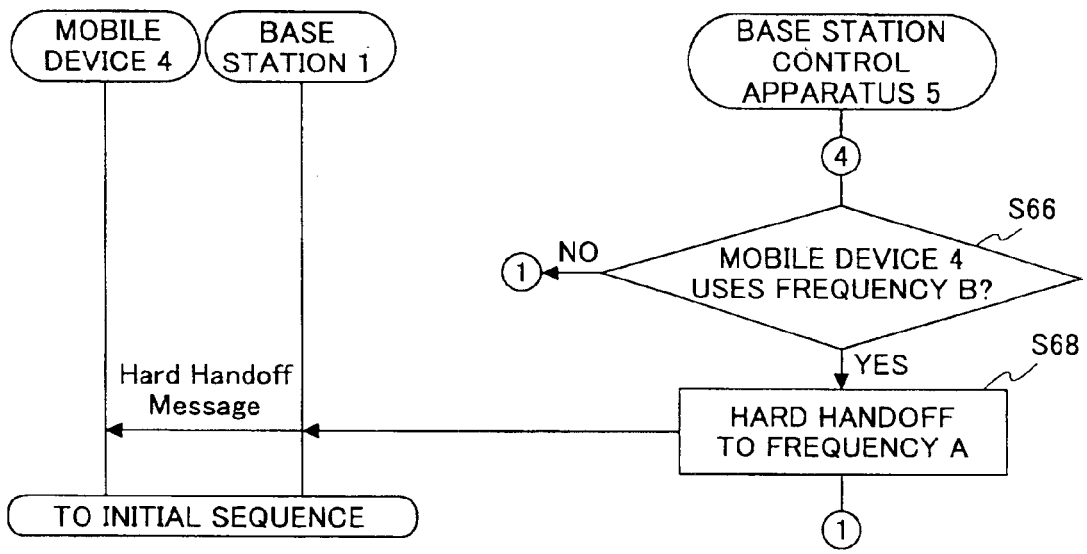

FIG.12
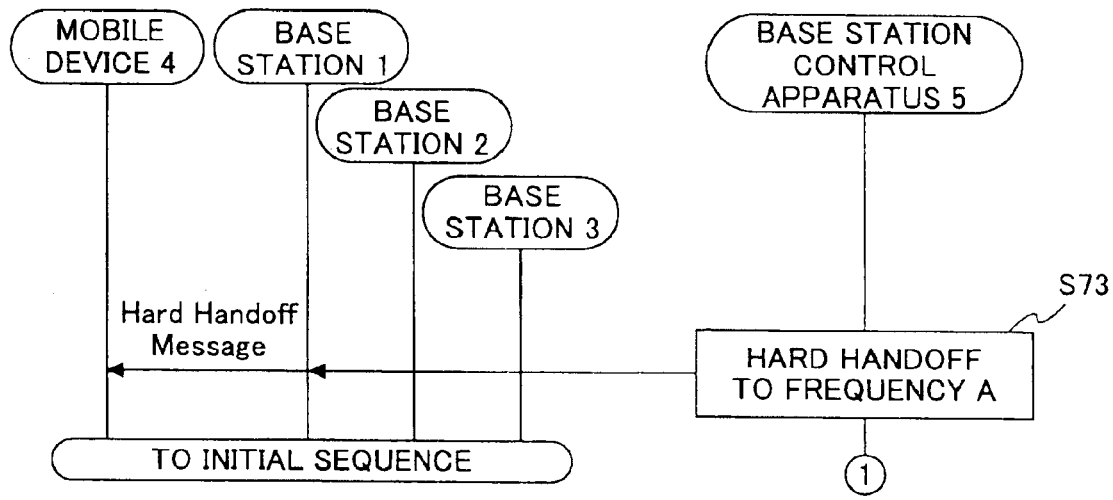
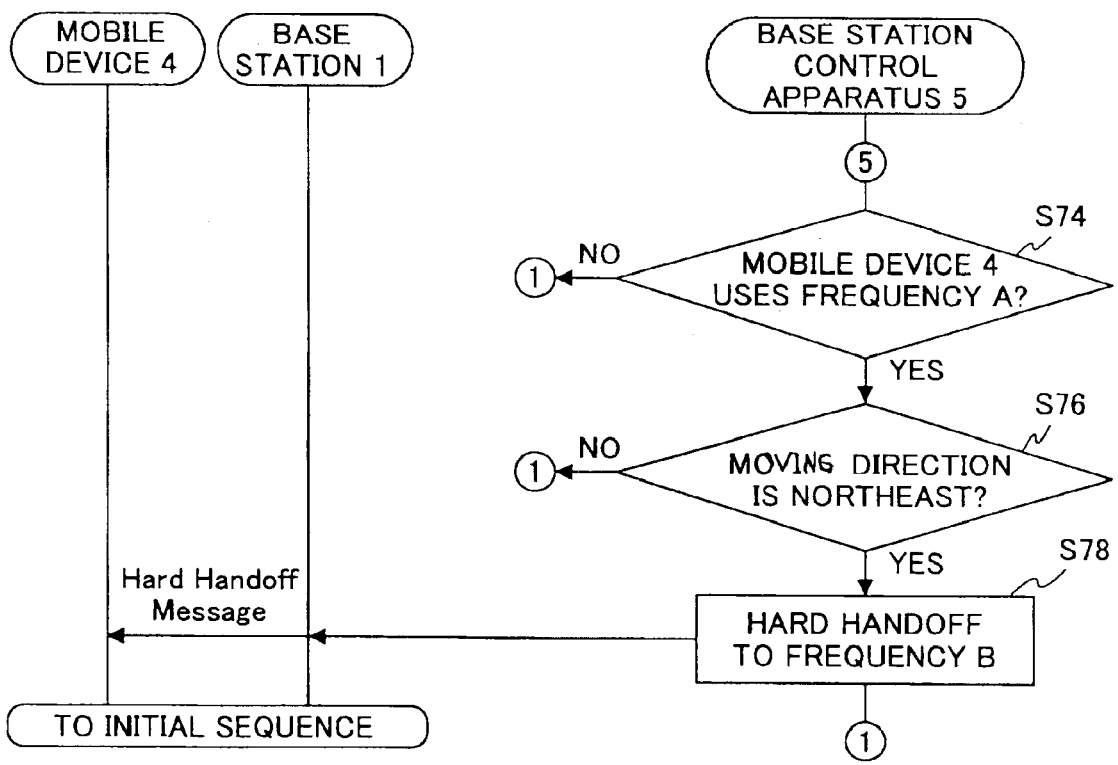

FIG.15
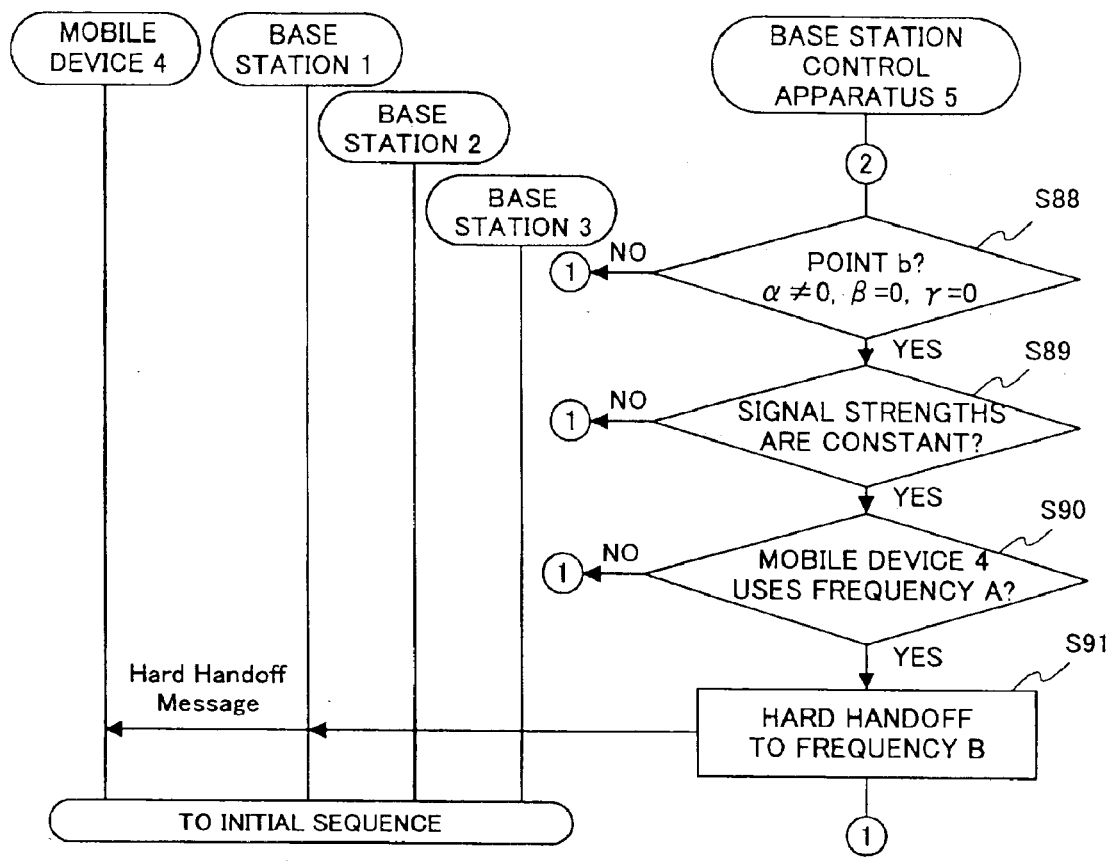
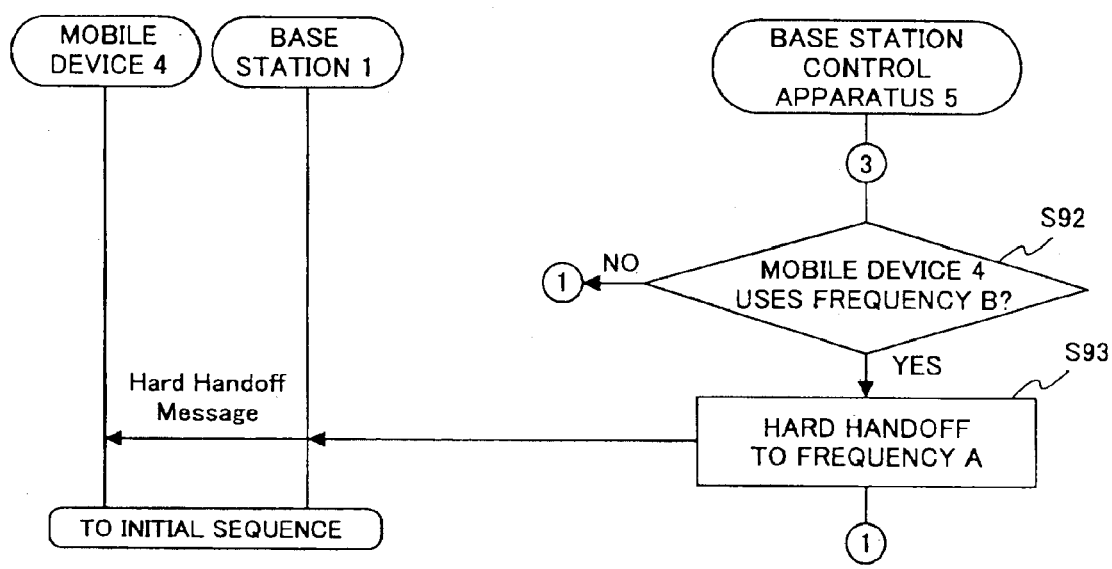

METHOD FOR CONTROL HAND-OFF OF CDMA SYSTEM, BASE STATION USED THEREFOR, AND BASE STATION CONTROLLER

This application is a continuation of international application number PCTJP99/06031, filed OCT. 29, 1999

TECHNICAL FIELD

The present invention relates to a handoff control method of a CDMA system, and a base station and a base station control apparatus used therefor, and more particularly, to a handoff control method of a CDMA system, and a base station and a base station control apparatus used therefor in a case where a cellular mobile communication system using a CDMA (Code Division Multiple Access) method has a plurality of frequency tiers.

BACKGROUND ART

In a CDMA cellular mobile communication system, a plurality of frequency tiers according to traffic intensity are prepared. Here, one frequency band subjected to a frequency diffusion is referred to as one frequency tier. For example, an operation conformation is adopted which prepares a large number of frequency tiers in an area, such as an urban area, where traffic is relatively high, and prepares a small number of frequency tiers in an area, such as a suburban area, where traffic is relatively low.

In a CDMA digital cellular mobile communication system, in a case of having a plurality of frequency tiers, a method has been conventionally used at a frequency-tier boundary representing a boundary for each frequency; in the method, a device transmitting to a mobile device only control signals, such as pilot signals corresponding to the number of frequency tiers identical to the tiers in each of the cells is installed in a base station in an adjacent cell so as to cause the mobile device to report of a destination cell and to switch (to hand off) to a frequency prepared in the adjacent cell.

Alternatively, another method has been used in which a base station in an adjacent cell is provided with a device capable of measuring an electromagnetic field intensity from a mobile device using a frequency not assigned to the cell so that the system recognizes a destination cell from the measurement result, and causes a handoff to a frequency that the adjacent cell prepares.

However, in a case where the present sell has only a tier of a frequency A and does not prepare a tier of a frequency B whereas the adjacent cell has the tiers of the frequencies A and B, a device (a beacon device) transmitting only a control signal with respect to a mobile device, such as a pilot signal of the tier of the frequency B, becomes necessary. Alternatively, a device measuring an electromagnetic field intensity from a mobile device using the tier of the frequency B not existing in the present cell needs to be prepared. Accordingly, these cases have had problems, such as that expenses for correspondent installations become necessary.

Secondly, there is a problem that a time before the execution of the handoff becomes longer, and as a result of this, a time during which an audio quality deteriorates becomes longer. This is because, in a case of measuring an electromagnetic field intensity with respect to a transmitted signal from a mobile device, the base station performs an operation of measuring the electric field intensity of the signal receivable from the mobile device after receiving from the mobile device a deterioration report to the effect that a sound has deteriorated.

Additionally, in a case of measuring the electromagnetic field intensity of the signal receivable from the mobile device in all neighboring cells so as to determine a destination cell, the time before the execution of the handoff becomes even longer. Therefore, there has been a problem of an increasing likelihood that the mobile device moves out of a service area before completion of the handoff so that the communication is disconnected.

In addition, as described in Japanese Laid-Open Patent Application No. 6-326653, there is a method that uses a tier of a common frequency A only in switching channels in communication and in setting a line upon sending and receiving a call, and uses tiers of frequencies B and C as calling channels. In this case, a usability of the tier of the common frequency A is aggravated, and additionally, installation expenses of the base station increase. Further, there has been a problem that, because of an increase in the number of times the frequencies are switched, the number of times of hard handoffs involving a momentary discontinuation increases, so as not to take full advantage of a soft handoff involving no momentary discontinuation which is a characteristic of the CDMA.

Further, as described in Japanese Laid-Open Patent Application No. 10-155173, in a case of switching frequencies-in-use in response to a deterioration report regarding the frequency being used from the mobile device, since a trigger of a handoff is a deterioration report of a pilot signal, a handoff control sometimes does not finish as to a mobile device moving at high speed. Also, there has been a problem that, since the frequency switching operation is sometimes performed in a case where the mobile device moves from a cell of the frequency-tier boundary to an inner cell (a cell not of the frequency-tier boundary), opportunities for the hard handoffs involving a momentary discontinuation increase.

DISCLOSURE OF INVENTION

It is a general object of the present invention to provide a handoff control method of a CDMA system which is free from a risk of a communication being disconnected upon an inter-cell handoff switching from a cell conducting the communication to a destination cell, can suppress a capital investment upon a system construction, can shorten a processing time unto a completion of a handoff, and can realize an efficient operation of the system as a whole.

In order to achieve this object, the present invention is arranged such that, in a handoff method of a CDMA mobile communication system in which one or a plurality of tiers of wireless frequencies are assigned on an individual wireless zone basis, locational information of a mobile device is obtained, and when, according to the locational information, the mobile device is present in the vicinity of a frequency-tier boundary where different frequency tiers are assigned to a cell conducting a communication and an adjacent cell, an inter-frequency handoff is performed to a tier of a common frequency prepared commonly in both the cell conducting the communication and the adjacent cell.

According to the handoff control method of the CDMA system as above, there is no risk of a communication being disconnected upon an inter-cell handoff switching from a cell conducting the communication to a destination cell, and there is no need for installing a device transmitting only a control signal, such as a pilot signal of a frequency not prepared in each of the cells, or for installing a device measuring an electromagnetic field intensity of a mobile device; therefore, a capital investment upon a system construction can be suppressed.

BRIEF DESCRIPTION OF DRAWINGS

Other objects, features and advantages of the present invention will become more apparent from the following detailed description when read in conjunction with the accompanying drawings.

FIG. 10 is a flowchart and a sequence of the second embodiment of the handoff control performed by the base stations and the base station control apparatus.

FIG. 12 is a flowchart and a sequence of the second embodiment of the handoff control performed by the base stations and the base station control apparatus.

FIG. 15 is a flowchart and a sequence of the third embodiment of the handoff control performed by the base stations and the base station control apparatus.

BEST MODE FOR CARRYING OUT THE INVENTION

Figure 1:
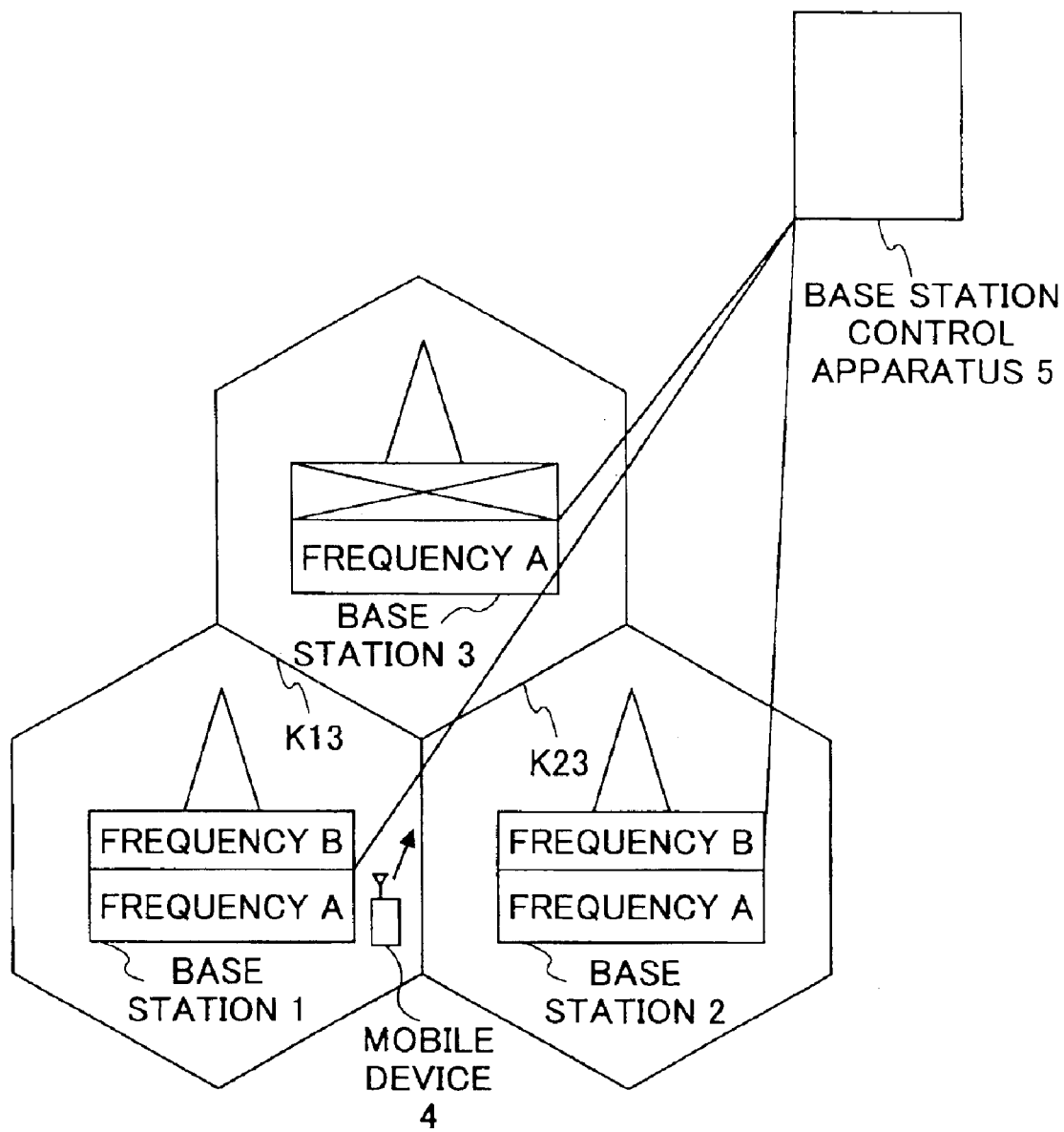
FIG. 1 is a system configuration diagram of a first embodiment of a CDMA digital cellular mobile communication system to which the present invention is applied.

Hereinbelow, a description will be given of a principle of the present invention.

In the present invention, a location of a mobile device in a cell is specified, and a handoff will be performed based on this locational information. For the purpose of specifying locational information of a mobile device, firstly, messages are sent out simultaneously from a plurality of wireless base station apparatuses to the mobile device the location of which is desired to be specified. Thereafter, a response message from the mobile device is received by each of the base stations. In CDMA, a time by which a mobile device responds to a message request from a base station is clearly prescribed; therefore, the base station can calculate a distance to the mobile device from a time difference between the received message and the transmitted message.

When distances to a particular mobile device are specified by three base stations, a location of the particular mobile device in a service area can be specified accurately. A method of specifying the location of the mobile device according to the distances from each of the base stations to the mobile device is based on a principle similar to a so-called triangulation. Therefore, when distances from four base stations to the mobile device can be specified, an altitude of the mobile device can be specified as a matter of course.

In the present invention, the locational information of the mobile device obtained as above is intended to be used as a trigger for a handoff. Firstly, a direction in which the mobile device moves is specified according to changes in time of the locational information, and when the mobile device is moving in a direction toward outside of a frequency tier, a tier of a common frequency prepared both in a cell conducting a communication and in a destination cell is selected as a frequency tier used beforehand, and an inter-frequency handoff switching frequency tiers in the cell conducting the communication is executed by using the selected tier of the common frequency, and thereafter, an inter-cell handoff switching from the present cell conducting the communication to the destination cell is executed.

Therefore, there is no risk of the communication being disconnected upon the inter-cell handoff switching from the cell conducting the communication to the destination cell, and there is no need for installing a device transmitting only a control signal, such as a pilot signal of a frequency not prepared in each of the cells, or for installing a device measuring an electromagnetic field intensity of the mobile device; therefore, a capital investment upon a system construction can be suppressed.

Secondly, when a mobile device present in a frequency-tier boundary cell uses a frequently used frequency tier existing in both the frequency-tier boundary cell and a frequency-tier out-of-range cell, the following handoff control is performed for the purpose of effective utilization of the frequency tiers. A moving velocity of a mobile device is specified from an amount of change of the locational information per unit time, and in regard to a mobile device present in the proximity of the center of the cell with the moving velocity being low, a handoff is executed such that a communication is performed by using a tier of an uncommon frequency assigned only to the cell conducting the communication (the frequency-tier boundary cell). Additionally, even when a mobile device is present in the proximity of a boundary between the cells, an inter-frequency handoff is executed such that a communication is performed by using the tier of the uncommon frequency assigned only to the cell conducting the communication, if the moving velocity is zero, i.e., the mobile device stops.

Thirdly, in regard to a mobile device present in the frequency-tier boundary cell using the frequency tier assigned only to the frequency-tier boundary cell and moving at a high moving velocity, a handoff is executed such that a communication is performed by using the tier of the common frequency existing in both the frequency-tier boundary cell and the frequency-tier out-of-range cell.

Thus, conjecturing the moving direction and the moving velocity of the mobile device can shorten a processing time of a handoff, and performing the brisk handoff control enables a realization of effective utilization of each of the frequency tiers, and a realization of an efficient operation of the system as a whole.

Hereinbelow, a description will be given, with reference to the drawings, of embodiments according to the present invention.

FIG. 1 is a system configuration diagram of a first embodiment of a CDMA digital cellular mobile communication system to which the present invention is applied. In this figure, since necessary traffic intensity is high in base stations 1 and 2, two tiers of two frequencies A and B are prepared, and since necessary traffic intensity is low in a base station 3, one tier of one frequency A is prepared. These base stations 1 to 3 are connected to a base station control apparatus 5, and the base station control apparatus 5 stores frequency composition information of each of the base stations on an individual base-station basis. A mobile device 4 located in a cell that the base station 1 forms moves from the base station 1 to a cell of the base station 3 while communicating at the tier of the frequency B.

Here, a frequency-tier boundary refers to a service area limit of a cell (the cell of the base station 1) conducting a communication at the tier of the frequency B, i.e., boundaries K13 and K23 between each of the cells of the base stations 1 and 2 and the base station 3, in a case where the tier of the frequency B used in the cell conducting the communication is not prepared in an adjacent cell (the cell of the base station 3). From a viewpoint of the mobile device 4 using the tier of the frequency B in the cell of the base station 1, the cells of the base stations 1 and 2 are frequency-tier boundary cells, and the cell of the base station 3 is a frequency-tier out-of-range cell.

Figure 3:
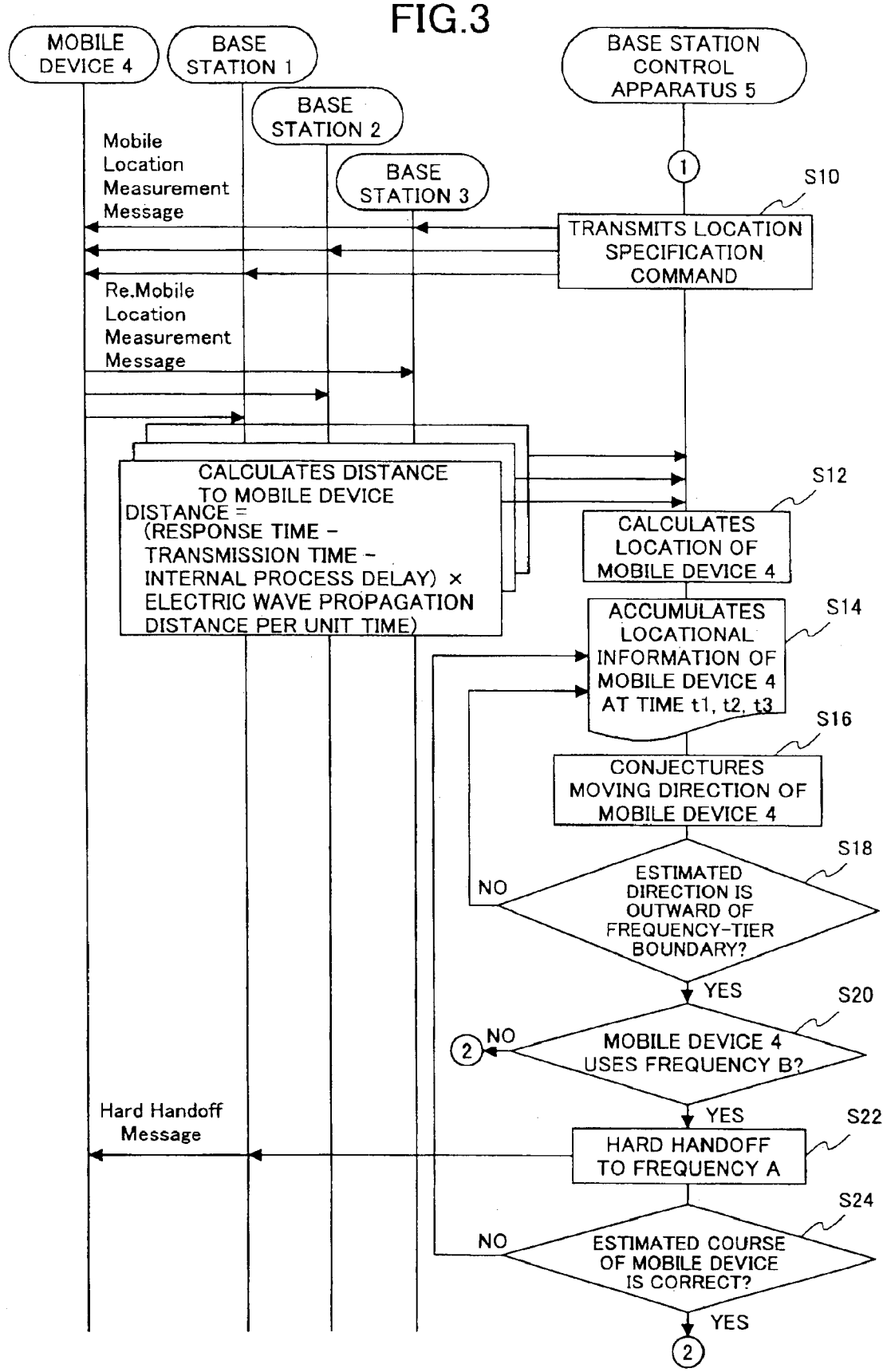
FIG. 3 is a flowchart and a sequence of the first embodiment of a handoff control performed by base stations and a base station control apparatus.
Figure 4:
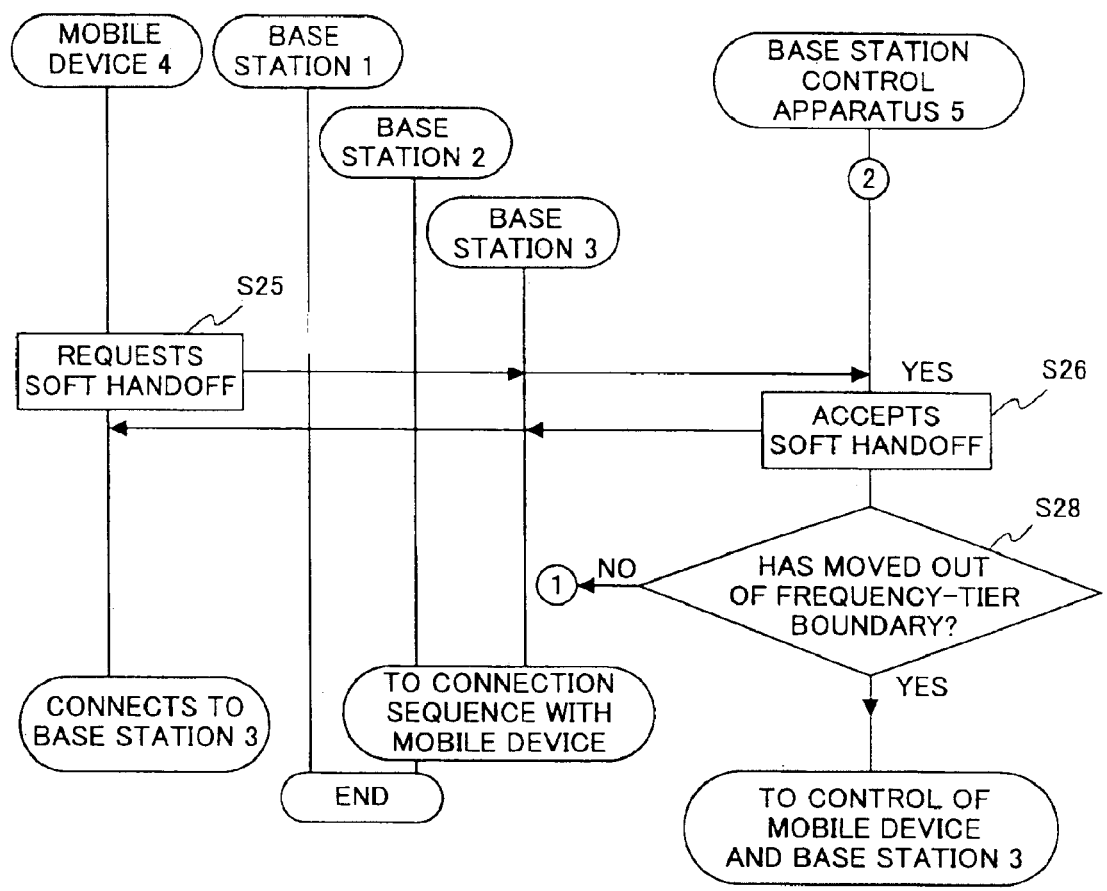
FIG. 4 is a flowchart and a sequence of the first embodiment of the handoff control performed by the base stations and the base station control apparatus.

FIG. 3 and FIG. 4 show a flowchart and a sequence of the first embodiment of a handoff control performed by the base stations and the base station control apparatus. In step S10 of FIG. 3, for the purpose of specifying a location of the mobile device 4, the base station control apparatus 5 sends out a message, for example, a Mobile Location Measurement Message (hereinafter referred to as MLM message), to the mobile device 4, the message being used for specifying the location with respect to the base stations 1, 2 and 3. The mobile device 4 having received this MLM message sends out a response message after a time standardized beforehand with respect to each of the base stations, for example, after a ½ symbol since the reception of the above-mentioned message.

In step S12, each of the base stations 1, 2 and 3 calculates a distance from the base station to the mobile device 4 according to a difference between a time of response with respect to the MLM message from the mobile device 4 and a time of sending out the MLM message to the mobile device, and reports the distance to the base station control apparatus 5. Based on the reported result from each of the base stations 1, 2 and 3, the base station control apparatus 5 specifies the location of the mobile device 4 in the service area, and accumulates this locational information. Then, in step S16, a direction in which the mobile device 4 moves is conjectured from the accumulated locational information.

Figure 2:
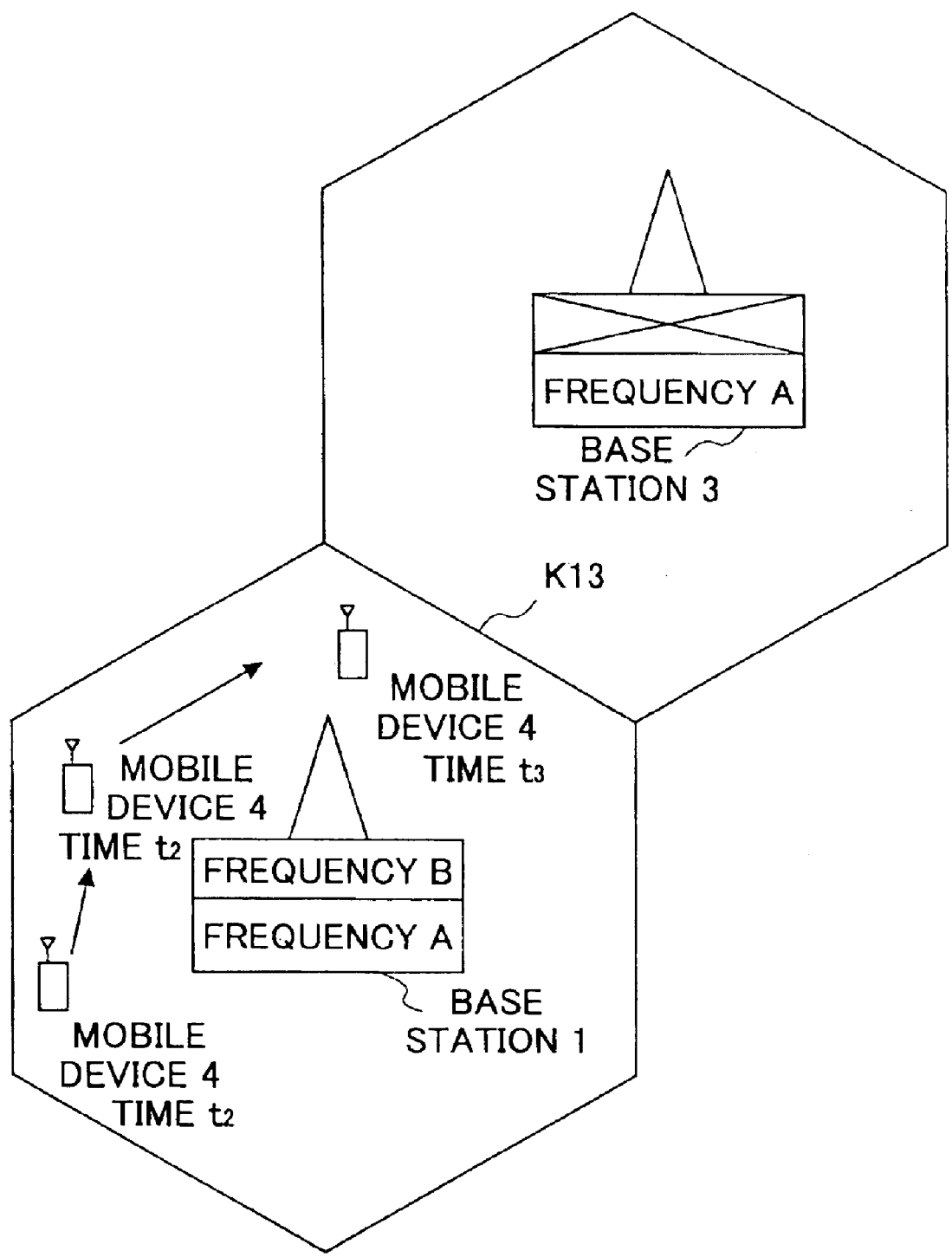
FIG. 2 is a diagram illustrating changes in time of locational information of a mobile device 4.

Besides, it may be arranged that the MLM message is sent out from one base station 1 to the mobile device 4, and the response message from the mobile device 4 is received by the three base stations. Further, arranging that the response message is received by four base stations enables an altitude of the mobile device to be specified; therefore, further detailed locational information of the mobile device can be obtained. The obtainment of the above-mentioned locational information may be performed regularly by the base station control apparatus 5 or the base stations 1, 2 and 3, or may be performed regularly by the base station 1, being triggered by a reception of a deterioration report of a pilot signal strength measurement message (a Pilot Measurement Message) from the mobile device 4, during a period therefrom until the present mobile device 4 leaves the base station's own control. The base station control apparatus 5 can conjecture the direction in which the mobile device 4 moves, according to changes in time of the locational information of the mobile device 4, as shown in FIG. 2.

Here, when it is judged in step S18 that the direction in which the mobile device 4 moves is a move toward a direction outside the frequency-tier boundary (e.g., the boundary K13), and further, in step S20, when the mobile device 4 is performing a communication by using the tier of the frequency B assigned only within the frequency-tier boundary (within the cells of the base stations 1 and 2), an inter-frequency handoff (a hard handoff) is performed to the tier of the frequency A assigned both within and outside the boundary, in step S22, while the mobile device 4 is present within the frequency-tier boundary. Thereafter, in step S24, it is judged whether or not an estimated course of the mobile device 4 is correct.

Then, when the mobile device 4 enters the cell of the base station 31 and there is a handoff request from the mobile device 4 in step S25, an inter-cell handoff (a soft handoff) is performed from the cell of the base station 1 to the cell of the base station 3 at the tier of the same frequency A, in step S26. According to this, even when the mobile device 4 moves out of the frequency-tier boundary, the communication can be continued without being interrupted. Thereafter, in step S28, it is judged whether or not the mobile device 4 has moved to the outside of the frequency-tier boundary, and when having moved to the outside of the frequency-tier boundary, the above-described sequence ends, and transits to another sequence led by the base station 3. Besides, the soft handoff is a handoff causing no momentary discontinuation during a call, and the hard handoff is a handoff causing a momentary discontinuation during a call.

Figure 5:
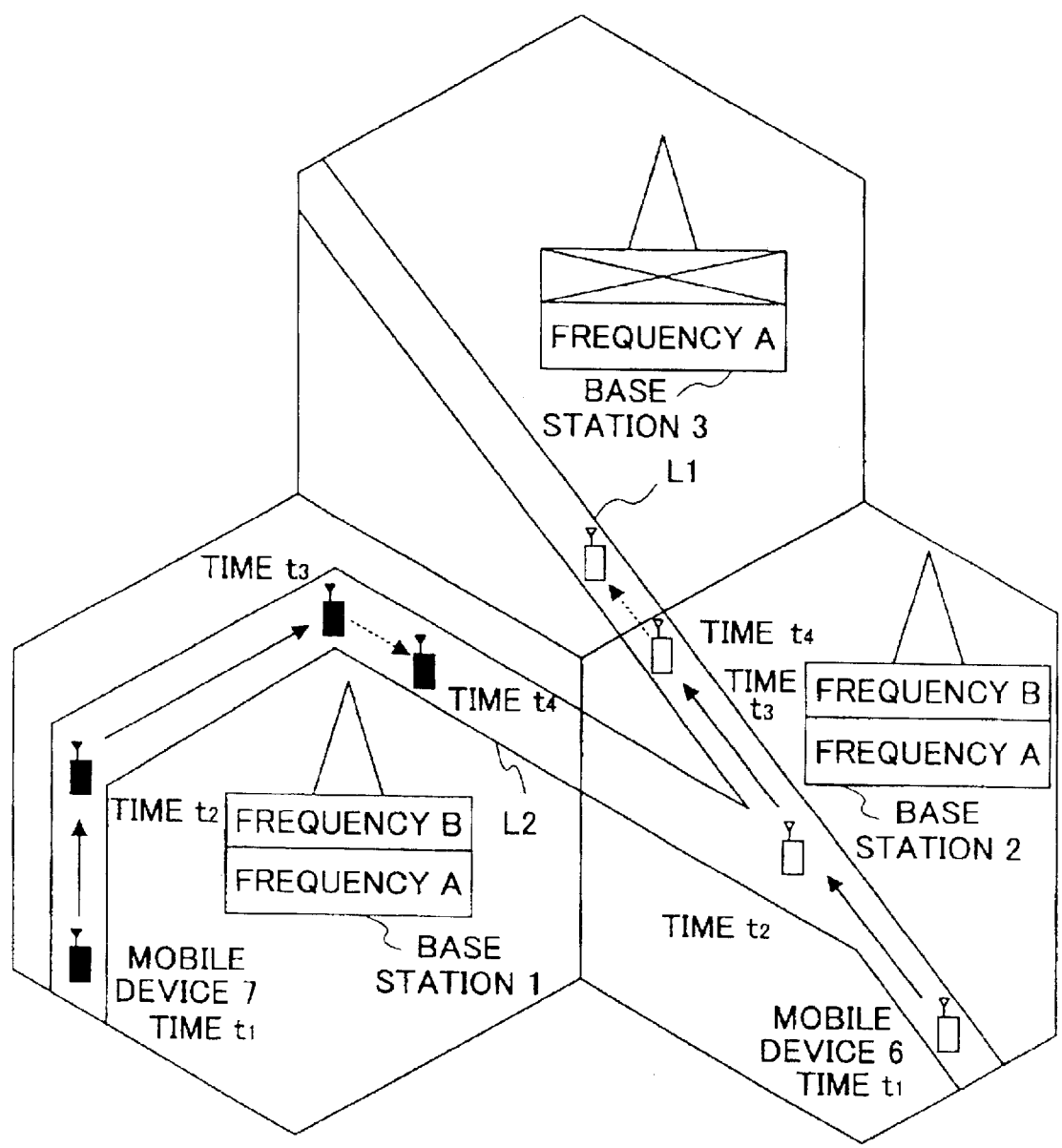
FIG. 5 is a diagram for explaining an embodiment in which cartographic information is added to a judgment of a moving direction of the mobile device.

Additionally, cartographic information, such as geographical features and roads in the service areas.(the cells) in which the base stations 1, 2 and 3 are situated, may be stored in the base station control apparatus 5 as means for judging the above-mentioned moving direction of the mobile device 4 so as to enable a detailed conjecture of the moving direction of the mobile device 4 while referring to the foregoing cartographic information. That is, it can be judged in further detail according to road conditions and geographical conditions whether or not the moving direction of the mobile device 4 is toward a direction outside the frequency-tier boundary. For example, it is conjectured from a moving direction and a condition of how a road L1 extends that a mobile device 6 shown in FIG. 5 is moving toward the outside of the frequency-tier boundary at a time t4; therefore, the tier of the frequency A needs to be selected.

To the contrary, with respect to a mobile device 7, although a moving direction thereof points to the outside of the frequency-tier boundary at a time t3, it is conjectured, from a road condition of a road L2 curving in the cell of the base station 1, that the mobile device 7 is not moving toward the outside of the frequency-tier boundary at a time t4; therefore, it can be judged that the tier of the frequency B can be maintained and that there is no need for the hard handoff switching the frequencies. As described above, combining the cartographic information with the moving-direction judgment of the mobile device enables a conjecture of an accurate moving direction, and an effective utilization of the frequently used tier of the common frequency A.

Figure 6:
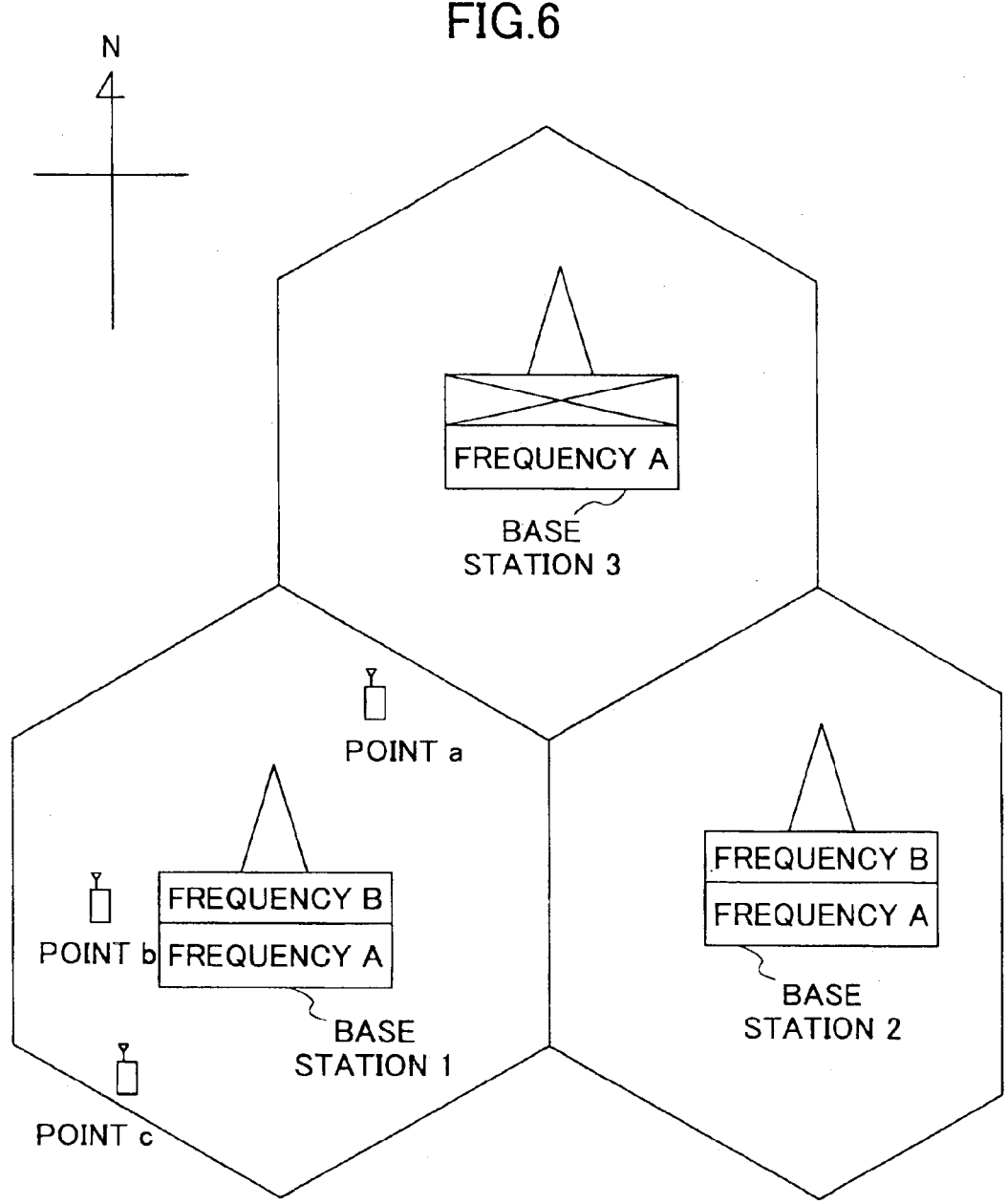
FIG. 6 is a system configuration diagram of a second embodiment of the CDMA digital cellular mobile communication system to which the present invention is applied.

FIG. 6 is a system configuration diagram of a second embodiment of the CDMA digital cellular mobile communication system to which the present invention is applied. In this figure, the same parts as in FIG. 1 are marked with the same marks. In FIG. 6, the tier of the common frequency A is assigned to each of the base stations 1, 2 and 3, and the tier of the frequency B is also assigned to the base stations 1 and 2 in which necessary traffic intensity is high.

Figure 7:
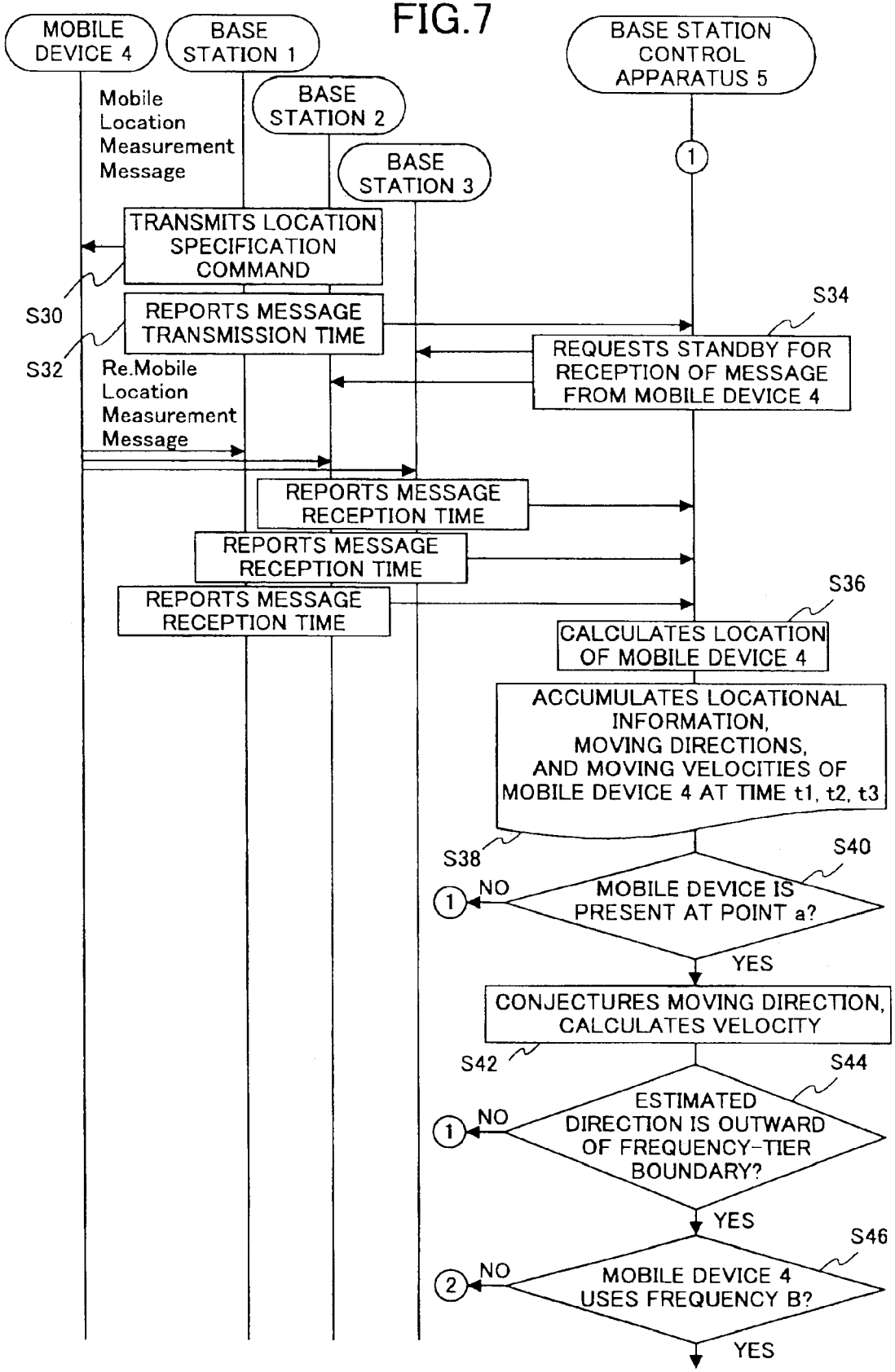
FIG. 7 is a flowchart and a sequence of the second embodiment of the handoff control performed by the base stations and the base station control apparatus.
Figure 8:
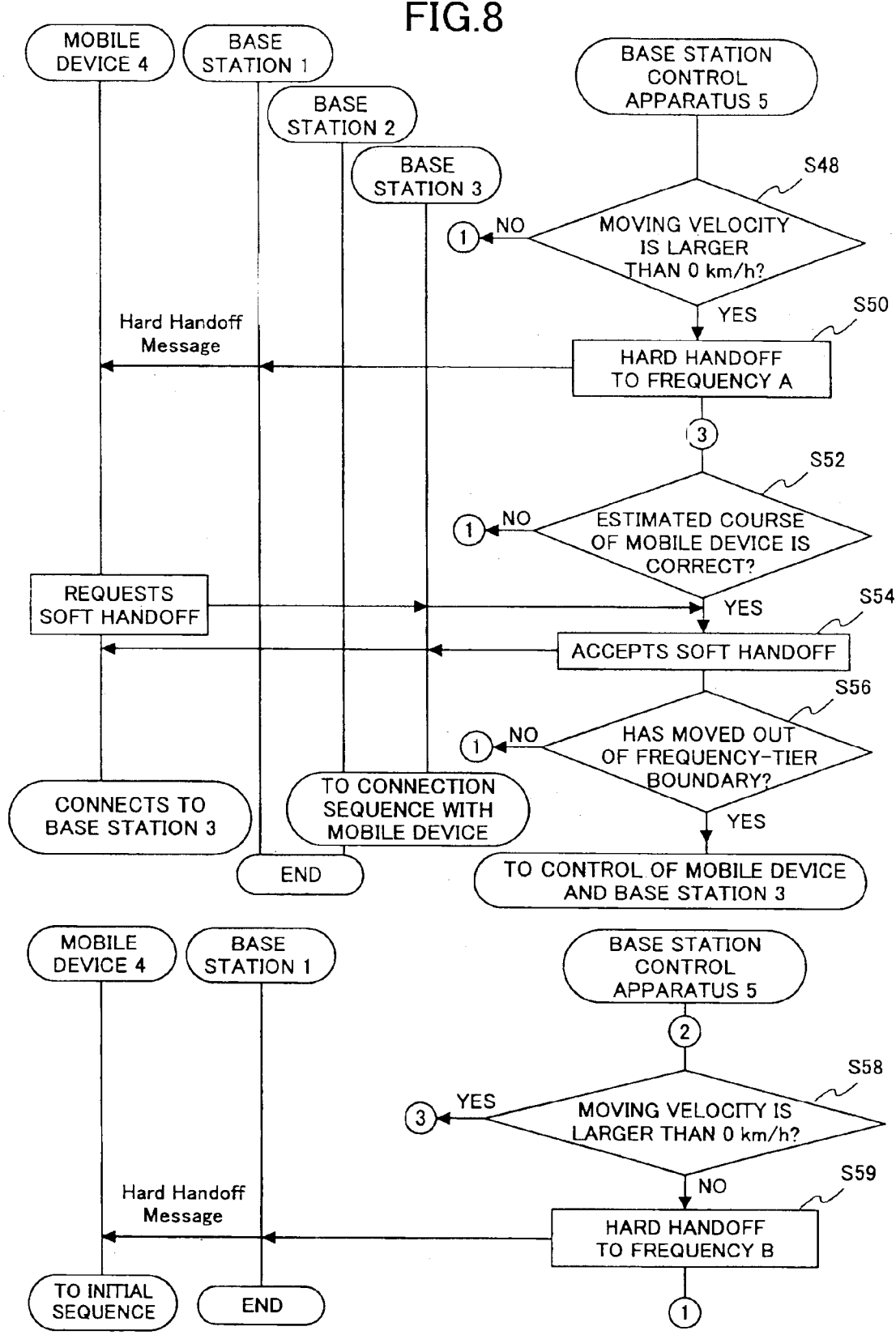
FIG. 8 is a flowchart and a sequence of the second embodiment of the handoff control performed by the base stations and the base station control apparatus.
Figure 9:
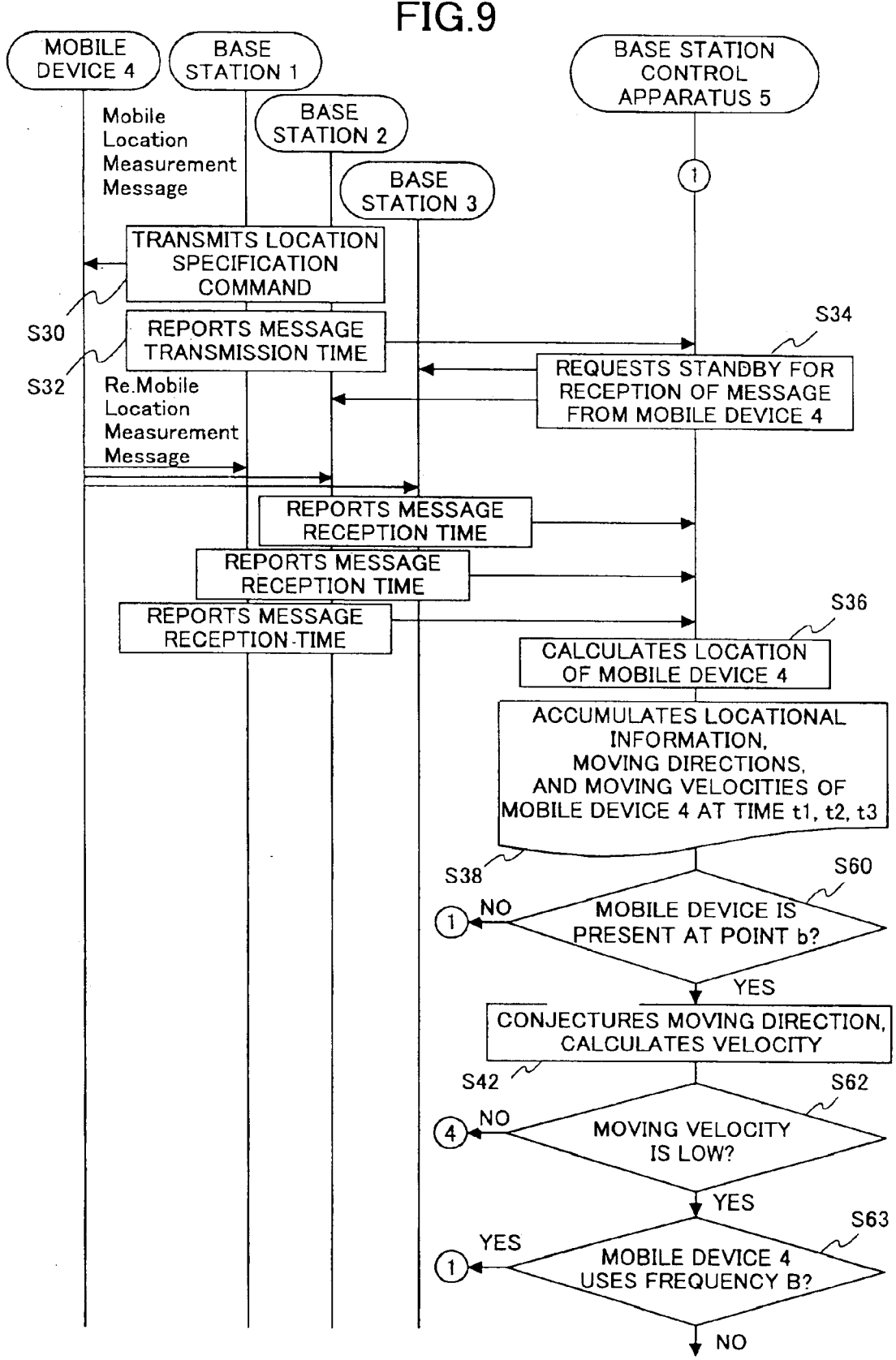
FIG. 9 is a flowchart and a sequence of the second embodiment of the handoff control performed by the base stations and the base station control apparatus.
Figure 11:
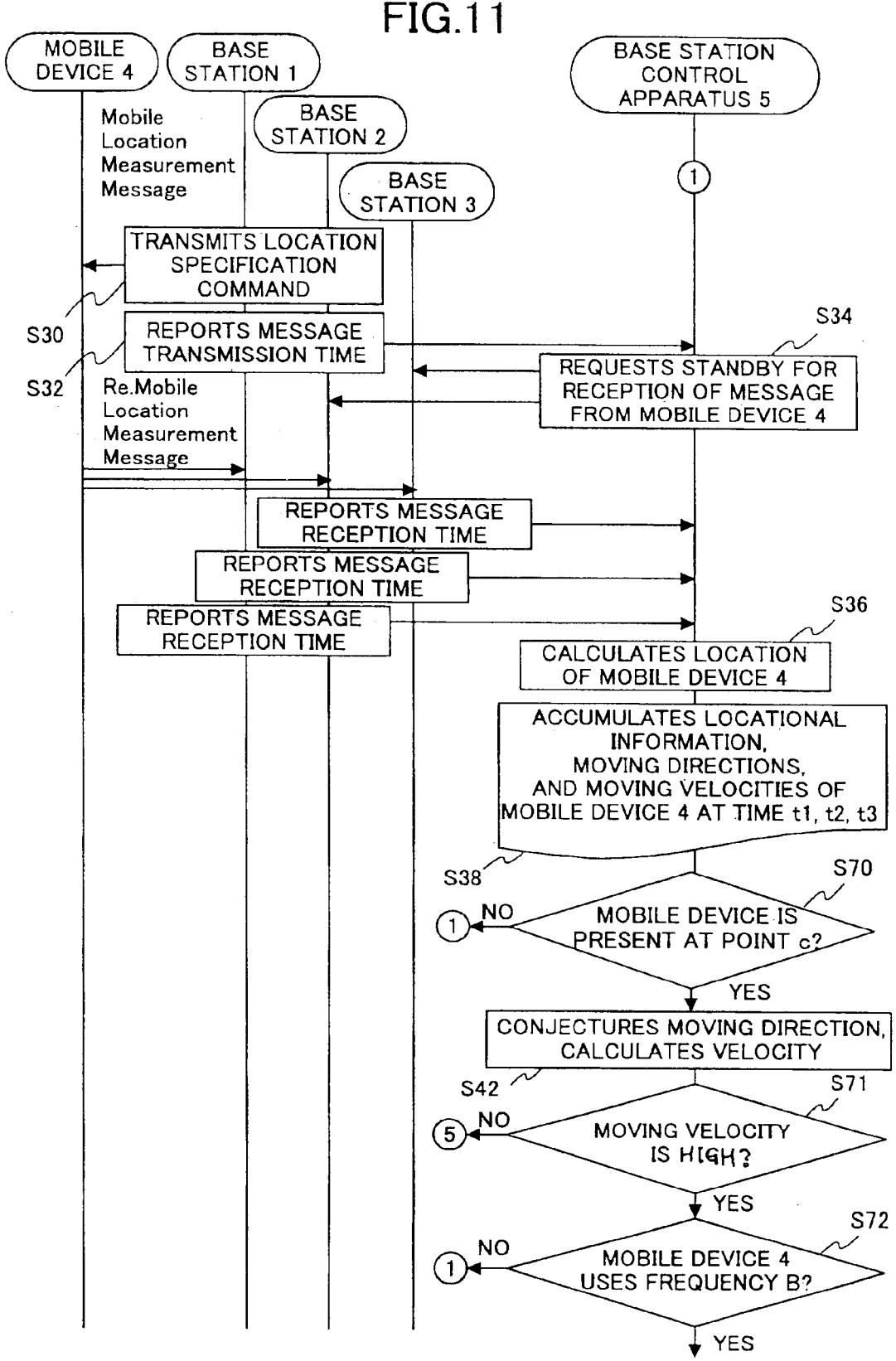
FIG. 11 is a flowchart and a sequence of the second embodiment of the handoff control performed by the base stations and the base station control apparatus.

FIG. 7 to FIG. 12 show flowcharts and sequences of the second embodiment of the handoff control performed by the base stations and the base station control apparatus. Among these, FIG. 7 and FIG. 8 show a case where the mobile device 4 is present at a point a in the vicinity of the frequency-tier boundary shown in FIG. 6, FIG. 9 and FIG. 10 show a case where the mobile device 4 is present at a point b in a center part of the cell shown in FIG. 6, and FIG. 11 and FIG. 12 show a case where the mobile device 4 is present at a point c shown in FIG. 6; identical parts in each case are marked with the same marks.

In step S30 of FIG. 7, for the purpose of specifying a location of the mobile device 4, the base station 1 sends out a message, such as the MLM message, to the mobile device 4, the message being used for specifying the location. Additionally, the base station 1 notifies the base stations 2 and 3 around the perimeter of the base station 1 via the base station control apparatus 5 with a purport that the base station 1 has sent out the MLM message with adding a send-out time (step S32). The mobile device 4 having received the foregoing MLM message sends out a response message-after a time standardized beforehand with respect to each of the base stations, for example, after a ½ symbol since the reception of the foregoing message. The base station 1 calculates a distance from the base station 1 to the mobile device 4 according to a difference between a time at which the base station 1 has received the response with respect to the MLM message from the mobile device 4 and a time at which the base station 1 has sent out the MLM message to the mobile device 4, and reports the distance to the base station control apparatus 5. In addition, each of the base stations 2 and 3 calculates a distance from the individual base station to the mobile device 4 according to a difference between a time at which the base station 1 has sent out the message and a time at which the individual base station has received the response message sent out from mobile device, and reports the distance to the base station control apparatus 5.

It is noted that, in the CDMA, each base station and a base station control apparatus are synchronized by a GPS (Global Positioning System) device. Based on the reported result from each of the base stations 1, 2 and 3, the base station control apparatus 5 specifies the location of the mobile device 4 in the service area, in step S36. Further, in step S38, the base station control apparatus 5 accumulates and analyzes locational information with respect to the mobile device 4 reported regularly from each of the base stations so as to accumulate data, such as locational information, moving directions, and moving velocities, with respect to the mobile device 4, on the basis of time.

Here, when the mobile device 4 is present at the point a shown in FIG. 6, and is moving, for example, in a northeast direction at 4 km/h, and if the mobile device 4 is performing a communication by using the tier of the frequency B, the base station control apparatus 5 directs the base station 1 to perform the hard handoff to the tier of the common frequency A (steps S40 to S50 in FIG. 7 and FIG. 8). Accordingly, when the mobile device 4 moves to the proximity of the boundary between the base station 1 and the base station 3, and there is a handoff request from the mobile device 4, the inter-cell handoff (the soft handoff) is performed from the cell of the base station 1 to the cell of the base station 3 at the tier of the same frequency A (steps S52 and S54). Thereafter, in step S56, it is judged whether or not the mobile device 4 has moved to the outside of the frequency-tier boundary, and when having moved to the outside of the frequency-tier boundary, the above-described sequence ends, and transits to another sequence led by the base station 3.

Additionally, when the mobile device 4 is present also at the point a, and stops at the same point, for example, at 0 km/h for 10 minutes, and if the mobile device 4 is performing a communication by using the tier of the common frequency A, the base station control apparatus 5 directs the base station 1 to perform the hard handoff to the tier of the frequency B (steps S58 and S59). This enables an effective utilization of the frequently used tier of the common frequency A.

Here, when the mobile device 4 starts moving again, and the moving direction is northeast, the base station control apparatus 5 directs the base station 1 to perform the hard handoff of the frequency of the mobile device 4 to the tier of the frequency A (steps S48 and S50). By doing this, the tier of the common frequency A can be used effectively, and at the same time, the communication can be secured.

Further, when the mobile device 4 is present at the point b shown in FIG. 6, and is moving, for example, in a northeast direction at 4 km/h, and if the mobile device 4 is performing a communication by using the tier of the frequency A, the base station control apparatus 5 directs the base station 1 to perform the hard handoff to the tier of the frequency B for the purpose of effective utilization of the tier of the frequency A (steps S60, S42, S62, S63 and S64 in FIG. 9 and FIG. 10). Thereafter, when the mobile device 4 approaches the frequency-tier boundary, for example, the point a, while continuing a call, the sequence proceeds to step S40 of FIG. 7, and the base station control apparatus 5 directs the base station 1 to perform the hard handoff to the tier of the common frequency A. By doing this, the tier of each of the frequencies can be used effectively, and at the same times the communication can be secured; and thereafter, even when the mobile device 4 moves over to the cell of the base station 3, performing the soft handoff can maintain the communication. On the other hand, when the mobile device 4 is moving at high speed, and is performing a communication by using the tier of the frequency B, the base station control apparatus 5 directs the base station 1 to perform the hard handoff to the tier of the common frequency A (steps S62, S66 and S68).

In addition, when the mobile device 4 begins a communication at the point c shown in FIG. 6, and is moving in a northeast direction at a high speed, for example, 50 kin/h, it is estimated that the mobile device 4 soon moves to the cell of the base station 3 outside the frequency-tier boundary; therefore, the base station control apparatus 5 directs the base station 1 to assign the tier of the common frequency A from the beginning (steps S70, S42, and S71 to S73 in FIG. 11 and FIG. 12). This prevents the communication from being disconnected due to an inter-cell movement in the course of the hard handoff process for the mobile device moving at high speed, and even when the mobile device 4 makes the inter-cell movement to the cell of the base station 3, performing the soft handoff can maintain the communication. On the other hand, when the mobile device 4 is moving in the northeast direction at a low speed, and is performing the communication by using the tier of the frequency A, the base station control apparatus 5 directs the base station ito perform the hard handoff to the tier of the uncommon frequency B (steps S62, S74, S76 and S78).

Figure 13:
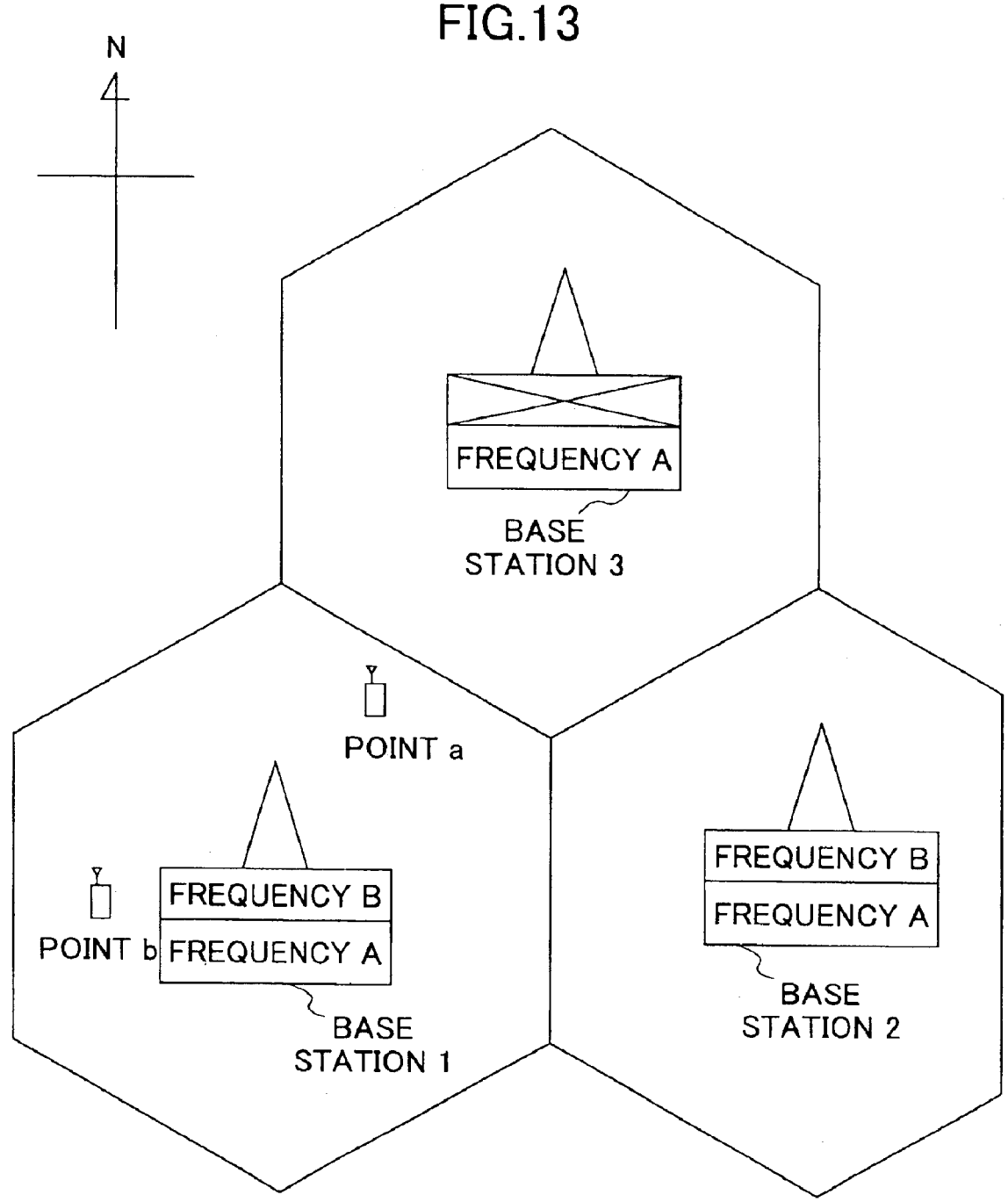
FIG. 13 is a system configuration diagram of a third embodiment of the CDMA digital cellular mobile communication system to which the present invention is applied.

FIG. 13 is a system configuration diagram of a third embodiment of the CDMA digital cellular mobile communication system to which the present invention is applied. In this figure, the same parts as in FIG. 1 are marked with the same marks. In FIG. 13, the tier of the common frequency A is assigned to each of the base stations 1, 2 and 3, and the tier of the frequency B is also assigned to the base stations 1 and 2 in which necessary traffic intensity is high.

In the CDMA, there is a function of continually controlling a signal strength transmitted and received between a base station and a mobile device for the purpose of realizing effective utilization of each frequency tier. Thereupon, locational information and a presence or an absence of a movement of the mobile device 4 can be observed in a simplified manner by utilizing a pilot signal strength measurement message used for the foregoing control function.

Figure 14:
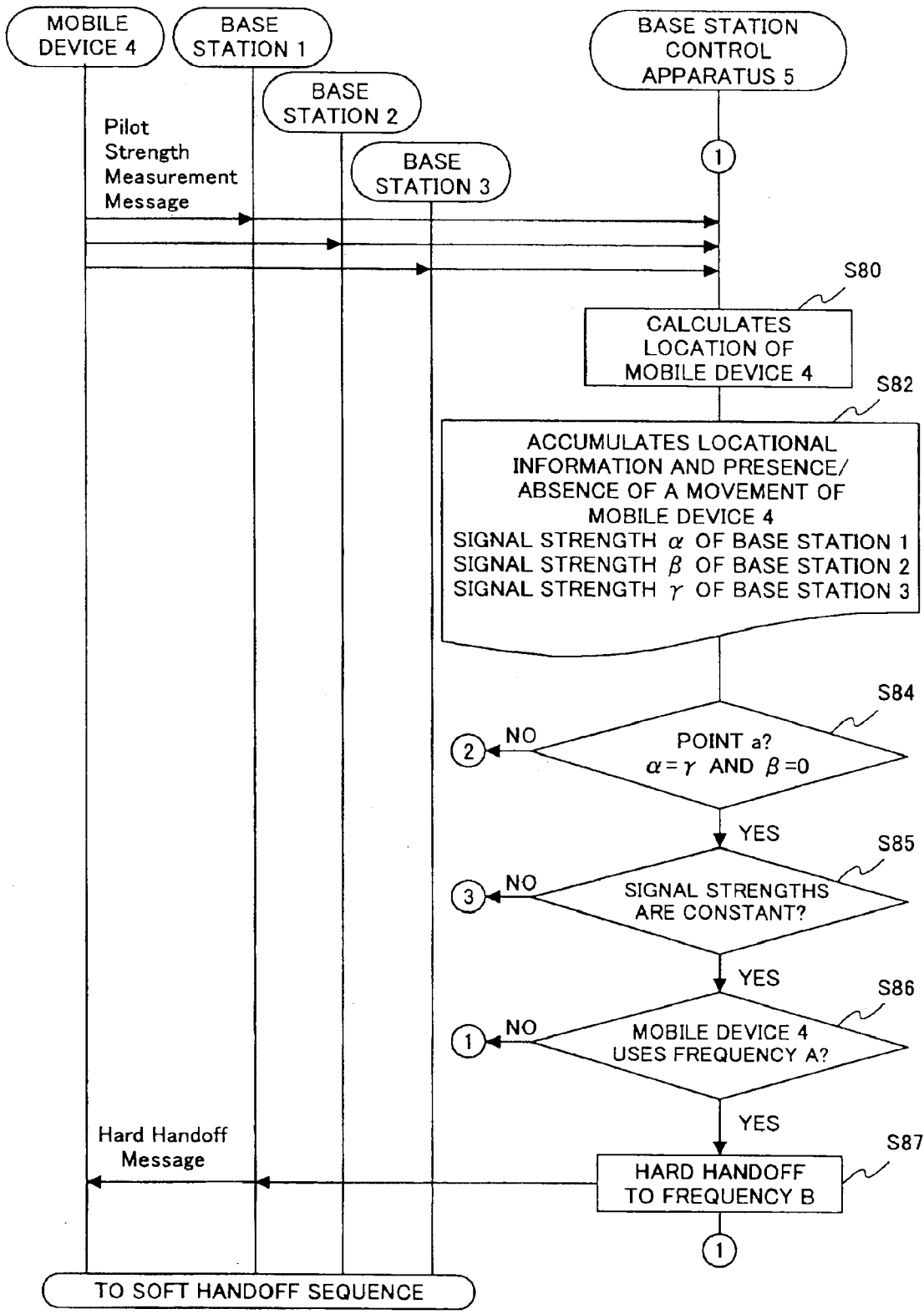
FIG. 14 is a flowchart and a sequence of the third embodiment of the handoff control performed by the base stations and the base station control apparatus.

FIG. 14 and FIG. 15 show a flowchart and a sequence of the third embodiment of the handoff control performed by the base stations and the base station control apparatus.

In step S80 of FIG. 14, the base station control apparatus 5 causes values ($\alpha$, $\beta$, $\gamma$) of the pilot signal strength measurement messages from the mobile device 4 in the base stations 1 to 3 to be imparted so as to calculate a location of the mobile device 4, and in step S82, the base station control apparatus 5 accumulates locational information and a presence or an absence of a movement with respect to the mobile device 4 reported regularly from each of the base stations.

Here, assuming that the mobile device 4 present at the point a stays at the same point, the pilot signal strength measurement messages indicate substantially constant values such that the signal strengths ($\alpha$, $\gamma$) from the base station 1 and the base station 3 become substantially identical values. Accordingly, in this case, if the mobile device 4 is performing a communication by using the tier of the common frequency A, the base station control apparatus 5 directs the base station 1 to perform the hard handoff to the tier of the frequency B (steps S84 to S87 in FIG. 14).

Additionally, when the mobile device is moving from the point a toward a northeast direction, the pilot signal strength measurement messages exhibit a characteristic that the pilot signal strength measurement message from the base station 1 becomes smaller as time goes by, and the pilot signal strength measurement message from the base station 3 becomes gradually larger as time goes by. In this case, if the mobile device 4 is performing a communication by using the tier of the frequency B, the base station control apparatus 5 directs the base station 1 to perform the hard handoff to the tier of the common frequency A (steps S84 and S85; S92 and S93 in FIG. 15).

Additionally, assuming that the mobile device present at the point b stays at the same point, the pilot signal strength measurement messages indicate substantially constant values, and only the pilot signal strength measurement message from the base station 1 is reported from the mobile device 4 to the base station 1 as a relatively large value. Accordingly, in this case, if the mobile device 4 is performing a communication by using the tier of the frequency A, the base station control apparatus 5 directs the base station 1 to perform the hard handoff to the tier of the frequency B (step S84; S88 to S91 in FIG. 15). Performing the control process as described above enables a realization of effective utilization of each frequency tier.

Thus, according to the present invention, there is no risk of a communication being disconnected upon the inter-cell handoff switching from a cell conducting the communication to a destination cell; and in all of cells of the frequency-tier boundary, even when a frequency tier prepared in an adjacent cell is not prepared in each of the cells, a capital investment upon a system construction can be suppressed, because there is no need for installing a device transmitting only a control signal, such as a pilot signal of the said frequency, or for installing a device measuring an electromagnetic field intensity of a mobile device. Further, conjecturing a moving direction and a moving velocity of a mobile device can shorten a processing time unto a completion of a handoff. Additionally, performing a brisk handoff control enables a realization of effective utilization of frequency tiers, and a realization of an efficient operation of the system as a whole.

Additionally, in the present invention, although the description is given of the configuration in which the subject of the control sequence is the base station control apparatus, the present invention is not limited thereto, and the control sequence can be distributed to the base station and the base station control apparatus.

Besides, steps S10 and S12 correspond to location conjecturing means described in the claims, step S22 corresponds to first handoff means, step S16 corresponds to moving-direction conjecturing means

What is claimed is:

1. A handoff control method of a CDMA system, in the handoff method of the CDMA mobile communication system one or a plurality of tiers of wireless frequencies are assigned on an individual wireless zone basis, wherein locational information of a mobile device is obtained, and when said mobile device is judged to be moving to cross a frequency-tier boundary where different frequency tiers are assigned to a cell conducting a communication and an adjacent cell, an inter-frequency handoff is performed to a tier of a common frequency prepared commonly in both said cell conducting the communication and said adjacent cell, wherein said mobile device is judged to be moving to cross the frequency-tier boundary by predicting a moving direction of said mobile device wherein the moving direction of said mobile device is conjectured by combining the locational information of said mobile device with cartogranhic information of said cell conducting the communication.

and wherein a subsequent soft handoff is performed following the inter-frequency handoff.

2. The handoff control method of the CDMA system as claimed in claim 1, wherein the moving direction of said mobile device is outward of the frequency-tier boundary, the inter-frequency handoff is performed tot he tier of said common frequency.

3. The handoff control method of the CDMA system as claimed in claim 1, wherein, when there is no change in the locational information of said mobile device, an inter-frequency handoff is performed from the tier of said common frequency to a tier of an uncommon frequency prepared in said cell conducting the communication and not prepared in said adjacent cell.

4. The handoff control method of the CDMA system as claimed in claim 2, wherein, when said mobile device is distant from said frequency-tier boundary according to said locational information, an inter-frequency handoff is performed to a tier of an uncommon frequency prepared in said cell conducting the communication and not prepared in said adjacent cell.

5. The handoff control method of the CDMA system as claimed in claim 4, wherein a moving velocity of said mobile device is conjectured from an amount of change of said locational information, and when said moving velocity is a high velocity, the inter-frequency handoff is performed to the tier of said common frequency.

6. The handoff control method of the CDMA system as claimed in claim 1, wherein a message used for location specification is transmitted to said mobile device, and a response message from said mobile device is received by each of a plurality of base stations, and said locational information is calculated based on time intervals defined by a transmission time said message and reception times od said message at each of the plurality of base sattions.

7. The handoff control method of the CDMA system as claimed in claim 1, wherein said locational information is calculated based on a pilot signal strength measurement message transmitted from said mobile device and received by each of a plurality of base station.

8. The handoff control method of the CDMA system as claimed in claim 7, wherein a moving velocity of said mobile device is conjectured based on an amount of change per unit time of the pilot signal strength measurement message received by said each of the plurality of base stations.

9. A base station and a base station control apparatus of a CDMA system, in the base station and the base station control apparatus of the CDMA mobile communication system one or a plurality of tiers of wireless frequencies are assigned on an individual wireless zone basis, the base station and the base station control apparatus of the CDMA system comprising:

location conjecturing means for obtaining locational information of a mobile device;

first handoff means for performing an inter-frequency handoff to a tier of a common frequency prepared commonly in both a cell conducting a communication and an adjacent cell, when said mobile device is moving to cross a frequency-tier boundary where different frequency tiers are assigned to said cell conducting the communication and said adjacent cell; and moving-direction conjecturing means for predicting a moving direction of said mobile device to judge whether said mobile device is moving to cross the frequency-tier boundary;

wherein said moving-direction conjecturing means conjectures the moving direction by combining the locational information of said mobile device with cartographic information of said cell conducting the communication.

and wherein a subsequent soft handoff is performed following the inter-frequency handoff.

10. The base station and the base station control apparatus of the CDMA system as claimed in claim 9, wherein said first handoff means performs the inter-frequency handoff to the tier of said common frequency when the moving direction of said mobile device is outward of the frequency-tier boundary.

11. The base station and the base station control apparatus of the CDMA system as claimed in claim 9, comprising, second handoff means for performing an inter-frequency handoff from the tier of said common frequency to a tier of an uncommon frequency prepared in said cell conducting the communication and not prepared in said adjacent cell, when there is no change in the locational information of said mobile device.

12. The base station and the base station control apparatus of the CDMA system as claimed in claim 10, comprising:

third handoff means for performing an inter-frequency handoff to a tier of an uncommon frequency prepared in said cell conducting the communication and not prepared in said adjacent cell, when said mobile device is distant from said frequency-tier boundary according to said locational information.

13. The base station and the base station control apparatus of the CDMA system as claimed in claim 12, comprising:

moving-velocity conjecturing means for conjecturing a moving velocity of said mobile device from an amount of change of said locational information, wherein said first handoff means performs the inter-frequency handoff to the tier of said common frequency when said moving velocity is a high velocity.

* * * * *